United States Patent [19]

Sklodowsky

[11] 4,111,448
[45] Sep. 5, 1978

[54] MOTORCYCLE PASSENGER SUPPORT

[76] Inventor: Paul George Sklodowsky, 108 Hillcrest Rd., Warren, N.J. 07060

[21] Appl. No.: 733,255

[22] Filed: Oct. 18, 1976

[51] Int. Cl.² .............................................. B62J 1/28
[52] U.S. Cl. ............................... 280/289 E; 280/202; 297/DIG. 9
[58] Field of Search ............... 280/202, 289 R, 289 G, 280/289 E; 224/30, 31, 32 A, 32 R; 297/243, 195, 380, DIG. 9

[56] References Cited

U.S. PATENT DOCUMENTS

| | | | |
|---|---|---|---|
| 3,549,172 | 12/1970 | McBroom | 280/202 |
| 3,746,392 | 7/1973 | German | 297/243 |
| 3,791,563 | 2/1974 | Raat | 224/31 |
| 3,802,598 | 4/1974 | Burger et al. | 297/243 X |
| 3,913,974 | 10/1975 | Bowen | 297/243 |
| 4,022,488 | 5/1977 | Likas | 280/202 |

FOREIGN PATENT DOCUMENTS 323,900   5/1970   Sweden .................................. 280/202

*Primary Examiner*—Kenneth H. Betts

*Attorney, Agent, or Firm*—Lerner, David, Littenberg & Samuel

[57] ABSTRACT

A passenger support and protective device for use in connection with a motorcycle is disclosed, including anchoring means for attachment to the motorcycle seat, an upper support structure attached to the anchoring means, and including a back rest adapted to support the passenger seated in a motorcycle seat and a pair of protective upper side rails attached to the back rest for protecting at least the lower torso of the passenger, and a lower support structure for stabilizing the device, including a substantially U-shaped rigidifying member disposed substantially in the plane of the motorcycle seat, and a pair of depending protective lower support rails attached to the rigidifying member for protecting at least the legs of the passenger. The anchoring means preferably substantially follow the contour of the motorcycle seat, and the device may also include a pair of foot support bars attached to the depending protective lower support rails, and means for attaching protective upper support rails to the anchoring means, which in turn is attached directly to the motorcycle seat.

10 Claims, 4 Drawing Figures

MOTORCYCLE PASSENGER SUPPORT

FIELD OF THE INVENTION

The present invention relates to devices for attachment to motorcycles for assisting in the support of passengers seated thereon. More particularly, the present invention also relates to means for protecting passengers seated on motorcycle seats. Still more particularly, the present invention relates to such means for protecting mototcycle passengers which are adapted to cooperate with the motorcycle seat.

BACKGROUND OF THE INVENTION

As the number, variety, and speed obtained during use of various bicycles and motorcycles has developed over the years, a number of different devices have been developed for attachment to or cooperation with such bicycles and motorcycles. In particular, various accessory seats, luggage racks, and the like have been developed, both for carrying additional passengers, and for carrying luggage, accessories and the like.

In particular, U.S. Pat. No. 3,873,127 discloses a multipurpose bicycle rack which is mounted behind the bicycle seat and over the rear wheel of the bicycle. This seat is also adaptable for conversion into a horizontal position for carrying luggage and the like.

Similarly, U.S. Pat. No. 3,746,392 discloses a cycle saddle which also provides an additional seat for attachment over the rear wheel and behind the bicycle seat.

Additionally, a number of motorcycle racks have also been utilized in the past, primarily for carrying luggage and the like. Thus, U.S. Pat. No. 3,791,563 discloses such a rack for attachment to the motorcycle frame and extension rearwardly therefrom. This device thus includes a shelf for carrying a load thereon while at the same time permitting a second rider to sit on the motorcycle seat during use. A similar type of rack is also shown in Swedish Pat. No. 323,900.

While each of these devices has been successful in varying degrees in accomplishing the purposes for which they are intended, none have provided a device which can be used in conjunction with the seat on a standard motorcycle to provide both support and protection for the passenger or passengers thereon.

SUMMARY OF THE INVENTION

In accordance with the present invention, a passenger support and protective device has now been discovered. Such a device thus includes anchoring means for attachment to the motorcycle seat, an upper support structure attached to the anchoring means, and including a back rest adapted to support a passenger seated in the motorcycle seat, and a pair of protective upper side rails attached to the backrest for protecting at least the lower torso of the passenger, and a lower support structure for stabilizing the device, including a substantially U-shaped rigidifying member disposed substantially in the plane of the motorcycle seat, and a pair of depending protective lower support rails attached to the rigidifying member for protecting at least the legs of the passenger.

In a preferred embodiment, means for attaching the protective lower support rails to the anchoring means are also provided, preferably including a support bracket attached to the anchoring means and a pair of support bars for attachment to the support brackets and to the protective upper side rails.

In another embodiment, of the present invention, the anchoring means substantially follow the contour of the motorcycle seat, and preferably includes a pair of parallel side members and a pair of parallel end members connecting the ends of the parallel side members so as to substantially surround the motor cycle seat.

In another embodiment of the present invention, the depending protective lower side rails are attached to the protective upper side rails, preferably at the point where the support bars are attached to the protective upper side rails.

In yet another embodiment of the present invention, the device includes a pair of foot rests projecting from the depending lower protective support rails, and the depending lower protective support rails are preferably substantially U-shaped in configuration, so that they straddle the rear wheel of the motorcycle. Preferably, the backrest is also attached to the substantially U-shaped rigidifying member.

In this manner, a passenger support and protective device is provided having a unitary construction, and attachable to the motorcycle seat primarily utilizing the pair of support brackets, so that the entire device can be easily put in place on the motorcycle or removed therefrom after use.

In addition, the device also permits the driver to have better control of the motorcycle when he is carrying a passenger primarily since it forces the passenger to sit in the proper position and attitude. This results in an added safety feature in connection with the use of this device.

BRIEF DESCRIPTION OF THE DRAWINGS

Other objects, advantages and results of the present invention can be seen with reference to the following detailed description, in conjunction with the accompanying drawings, in which.

DETAILED DESCRIPTION

Figure 3:
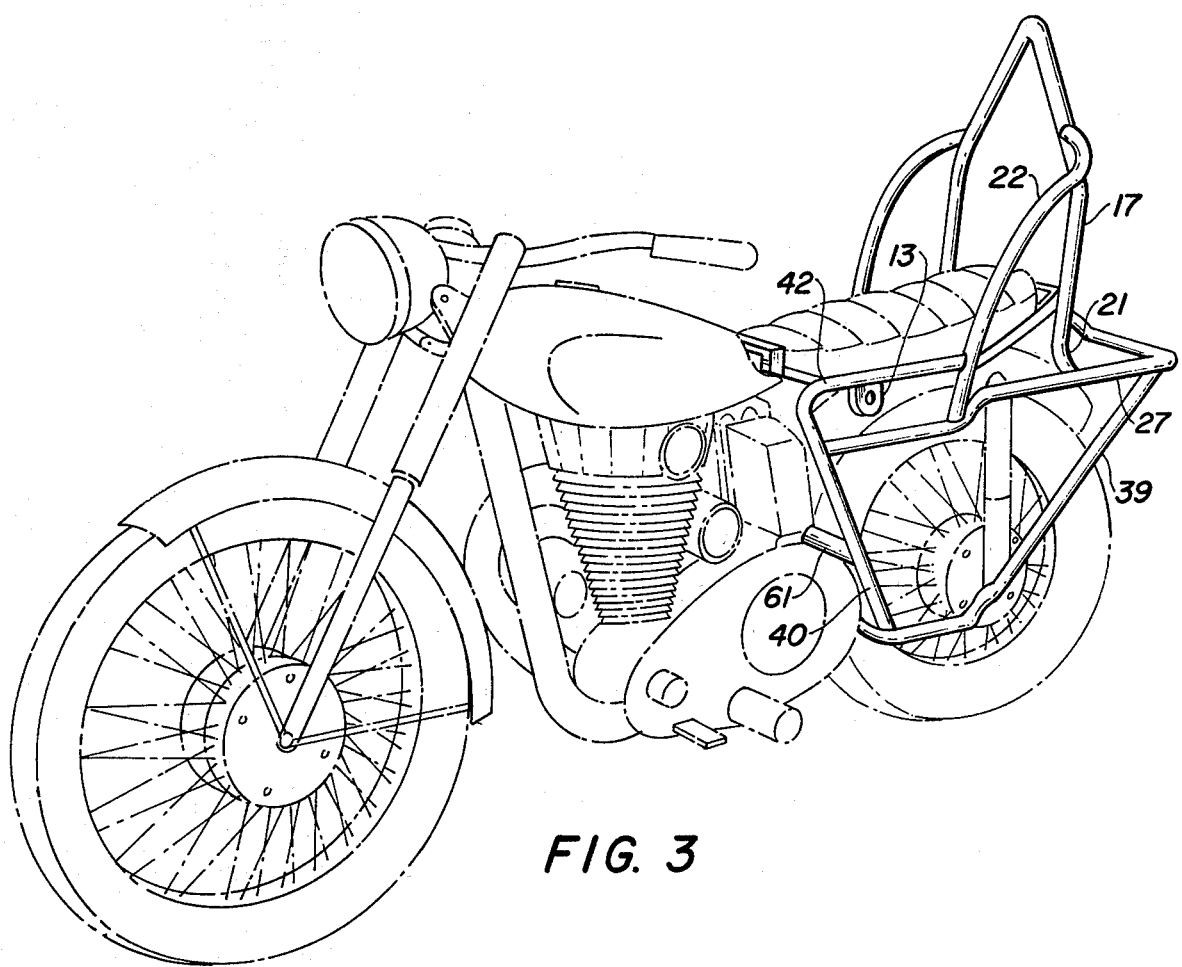
FIG. 3 is a front elevational view of the passenger support and protective device of the present invention in conjunction with a standard motorcycle, with the passenger shown thereon.
Figure 4:
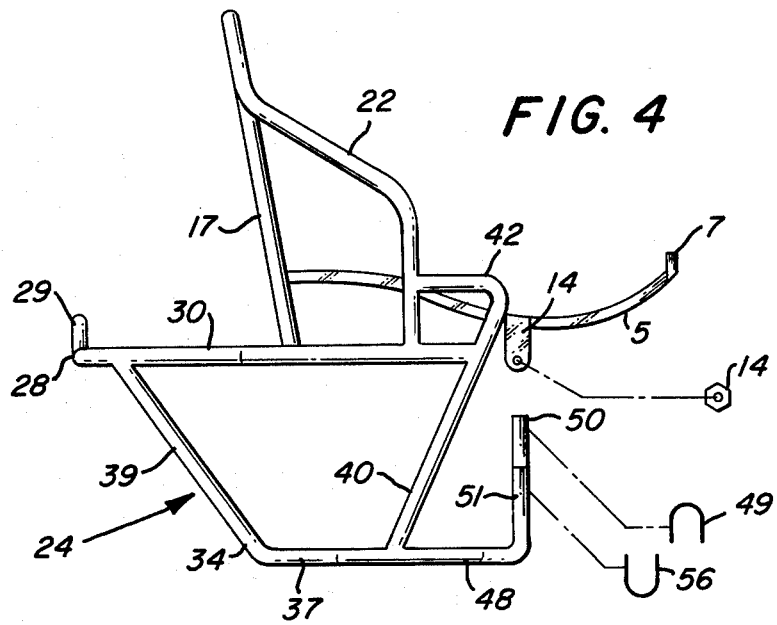
FIG. 4 is a right elevational side view of the passenger support and protective device of the present invention and attachment means for use in connection therewith.

Specifically referring to the figures, in which like numerals refer to like portions thereof, the device of the present invention can be easily placed in position on a standard motorcycle for use in supporting and protecting a passenger, as best shown in FIG. 3 hereof.

Figure 1:
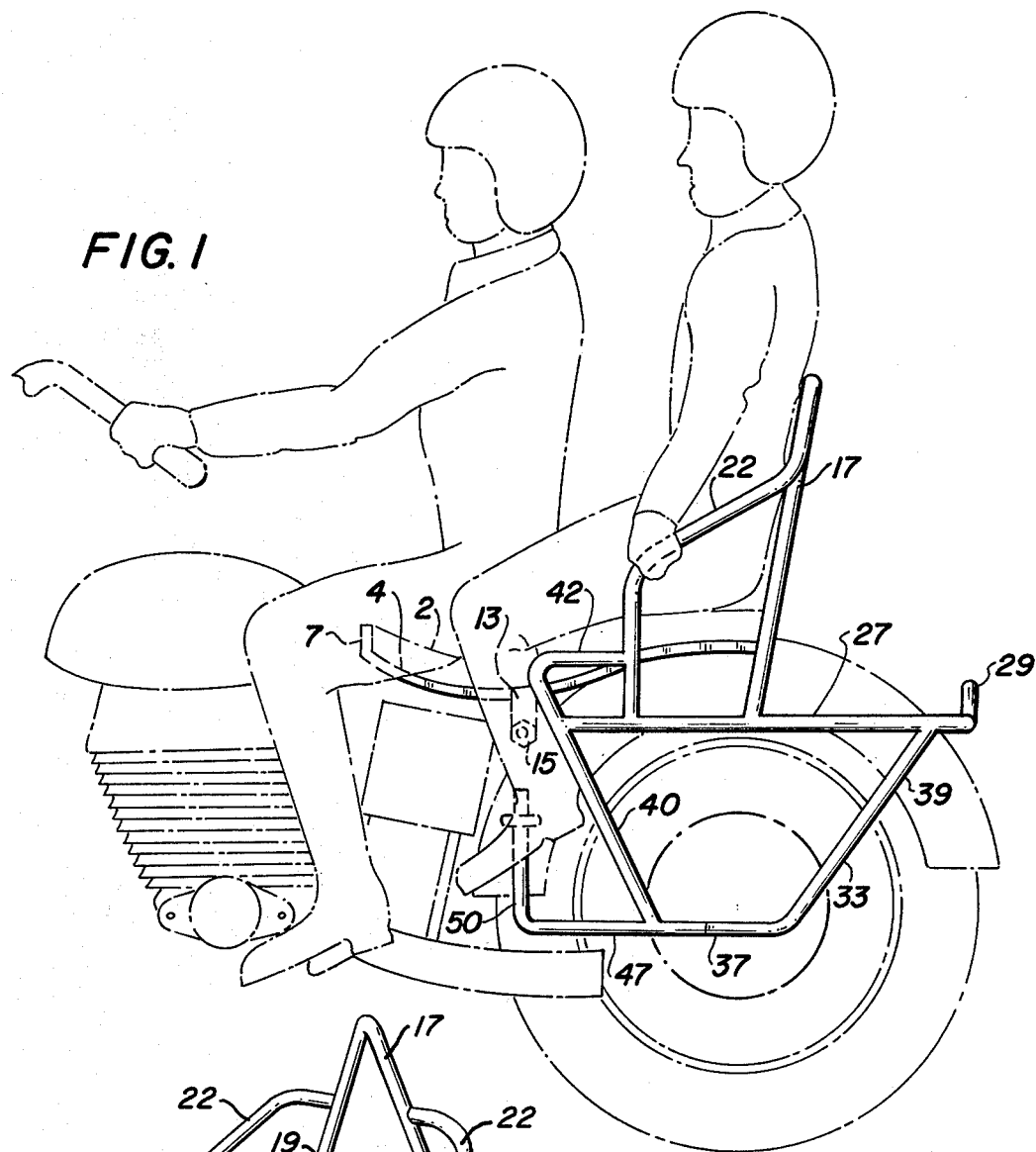
FIG. 1 is a side elevational view of the passenger support and protective device of the present invention in conjunction with a portion of a motorcycle, including the motorcycle seat.

The device itself thus includes means for anchoring the entire device to the motorcycle seat 2, including a pair of parallel side members 4 and 5, which substantially follow the contour of seat 2, as can be seen in FIG. 1. These two parallel side members are attached together by a pair of parallel end members 7 and 9, which are substantially perpendicular to the parallel side members 4 and 5. The end members preferably are generally U-shaped in configuration, including leg portions 11, which are firmly attached to the parallel side members 4 and 5, to permit the entire anchoring means to be placed about and affixed to the motorcycle seat 2 in the manner shown. The end members thus cross over the end portions of the seat in the manner shown in FIG. 1. The anchoring means itself can be firmly affixed to the frame at a point under the seat by means of brackets 13 and 14, attached to the mid-portion of the parallel side members 4 and 5, by means of nuts and through bolts 15. This structure, which constitutes anchoring means for the entire support and protective device, provides the primary means for attachment of the entire device to the motorcycle and its stabilization in that regard.

The device itself includes a backrest 17, which as shown in the drawings, has a substantially inverted V-shaped configuration and two leg portions 19 of the backrest 17, which are preferably attached to the ends of the rearward end member 9 of the anchoring means. Such attachment may be made in a conventional manner, such as by welding, etc. The lower portions of these leg portions 19 then extend outwardly at 21, for attachment in a manner to be discussed more fully below.

Attached to the upper portion of the backrest 17 are a pair of protective upper side rails 22. These side rails thus extend from the upper portion of the backrest in an outward and downward direction, so as to be disposed on either side of a passenger seated on the motorcycle seat 2. These side rails thus provide significant protection for the passenger while riding on the motorcycle. The lower end of the side rails 22, and its attachment to the lower structure of the support and protective device of this invention will also be discussed more fully below.

Figure 2:
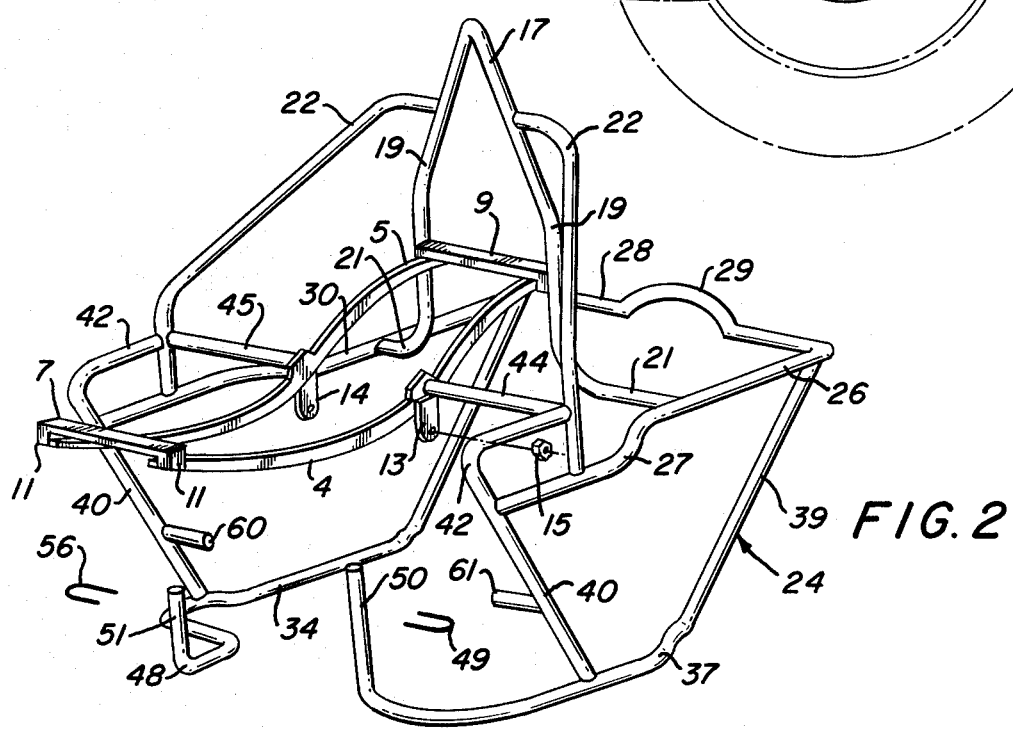
FIG. 2 is a left front perspective view of the passenger support and protective device of the present invention.

While the above-described backrest protective upper side rails thus generally comprise the upper support structure of the passenger support and protective device of this invention, the lower support structure, generally designated 24, will now be more fully described. A substantially U-shaped rigidifying member 26 thus provides the upper portion of the lower support structure. This member thus includes a pair of substantially parallel side legs 27 and 30, and a rear crossleg 28. In use, this entire structure straddles the rear wheel of the motorcycle, with the two side legs 27 and 30 running along the sides of the rear wheel, and the crossleg 28 placed across the rear fender or the like associated with that rear wheel. As shown in the drawings, the rear crossleg 28 includes an arched portion 29 which conveniently fits around the rear light of the motorcycle. This portion of this device can also serve the function of a storage or luggage rack. The extending lower portions 21 of the leg portions 19 of backrest 17 are thus attached to the side legs 27 and 30 of the substantially U-shaped rigidifying member 26. Again, as in each of the cases discussed with respect to this device, such attachment is obtained in a conventional manner, such as by welding and the like, or by means of nuts and bolts, etc. In addition, the depending lower portions of the protective upper side rails 22 are also affixed to the side legs 27 and 30 of the substantially U-shaped rigidifying member 26, in this case at the forward portions thereof. Affixed to the substantially U-shaped rigidifying member 26 and depending therebelow, i.e. on either side of the motorcycle when in use, are the depending protective lower support rails 33 and 35. These lower protective support rails are thus generally U-shaped in configuration, including a lower portion 37 and two outwardly extending legs 39 and 40. The rearward extending leg 39 is thus attached to the lower portion of the substantially U-shaped rigidifying member 26, i.e. approximately at the point where the side legs 27 and 30 are joined to the cross leg 28. The forward extending legs 40 of the protective lower support rails 33 and 35 are attached to the forward end of the side legs 27 and 30 of the U-shaped rigidifying member 26. These forward legs 40 also continue extending upwardly to provide inwardly curved end members 42. The ends of these members 42 are thus attached to the lower depending portions of the upper protective side rails 22. Finally as shown in FIG. 2,, a pair of support bars 44 and 45 extend from the point where the end members 42 are attached to the upper protective side rails to the brackets 13 and 14 which attach the anchoring means to the motorcycle frame at a point under the seat.

Finally, the lower portion 37 of the generally U-shaped depending protective lower support rails 33 and 34 also extend forward, and include substantially L-shaped portions 47 and 48. These particular end portions, terminating in upwardly extending legs 50 and 51, may be adapted for attachment to the motorcycle depending upon the particular motorcycle being utilized. These extending portions 50 and 51 may thus be attached to the lower frame portion of the motorcycle, such as by using clips 56 extending over the end portions of extending legs 50 and 51, and attaching same to the lower structure of the motorcycle itself.

In addition, footrests 60 and 61 also extend substantially horizontally from the upwardly extending protective lower support rails 40, so that the rider may rest his feet on these foot support rests 60 and 61 while utilizing this device. As can also be seen in FIG. 3, the depending protective lower support rails, particularly portions 40 thereof, depend on either side of the legs of the passenger, and provide additional protection in that manner.

The entire device, which is preferably prepared from metal rods of various light, but rigid materials, such as aluminium round bars and/or round steel tubing can thus be easily lifted directly into position, attached to the motorcycle merely by applying bolts 15 with associated screws, through the holes in brackets 13 and 14, into the upper structure of the motorcycle frame by attaching clips 56 to the upward extending portions 50 and 51 of the lower support structure 24 to the lower frame of the motorcycle. The entire device is thus rigidly attached to the motorcycle frame and in connection with the motorcycle seat provides not only firm and rigid support for the passenger, but extremely valuable protection for that passenger and/or driver during use of the motorcycle, without in any way interfering with the driver's mobility, or actual use of the motorcycle itself.

Other embodiments of this invention will be apparent to those skilled in this art, and the inventive concept is not intended to be limited in any way by the foregoing description.

What is claimed is:

1. A passenger support and protective device for use in connection with a motorcycle having a seat, said device comprising anchoring means for attachment to the frame of said motorcycle, an upper support structure attached to said anchoring means, said upper support structure including a backrest adapted to support a passenger seated in said seat, and a pair of protective upper side rails attached to said backrest for protecting at least the lower torso of said passenger, and a lower support structure for stabilizing said device, said lower support structure including a substantially U-shaped rigidifying member disposed substantially in the plane of said seat, and a pair of depending protective lower support rails attached to said rigidifying member for protecting the legs of said passenger.

2. The passenger support and protective device of claim 1 including means for attaching said protective upper side rails to said anchoring means.

3. The passenger support and protective device of claim 2 wherein said means for attaching said protective upper side rails to said anchoring means comprise a support bracket attached to said anchoring means and a pair of support bars connecting said support brackets to said protective upper side rails.

4. The passenger support and protective device of claim 3 wherein said depending protective lower side rails are attached to said protective upper side rails.

5. The passenger support protective device of claim 4 wherein said depending protective lower side rails are attached to said protective upper side rails at the point where said support bars ara attached to said protective upper side rails.

6. The passenger support and protective device of claim 1 wherein said anchoring means substantially follows the contour of said seat.

7. The passenger support and protective device of claim 6 wherein said anchoring means includes a pair of substantially parallel side members and a pair of substantially parallel end members connected to the ends of said side members so as to substantially surround said seat.

8. The passenger support and protective device of claim 1 including a pair of footrests projecting from said depending lower protective support rails.

9. The passenger support and protective device of claim 1 wherein said depending lower protective support rails are substantially U-shaped in configuration, and wherein said depending lower protective support rails straddle the rear wheel of said motorcycle.

10. The passenger support and protective device of claim 1 wherein said backrest is attached to said substantially U-shaped rigidifying member.

* * * * *